(12) United States Patent
Ahn et al.

(10) Patent No.: US 8,165,535 B2
(45) Date of Patent: Apr. 24, 2012

(54) SYSTEMS, METHODS AND APPARATUSES FOR COMPLEMENTARY METAL OXIDE SEMICONDUCTOR (CMOS) ANTENNA SWITCHES USING SWITCHED RESONATORS

(75) Inventors: Minsik Ahn, Atlanta, GA (US);
Chang-Ho Lee, Marietta, GA (US);
Jaejoon Chang, Duluth, GA (US);
Wangmyong Woo, Cumming, GA (US);
Haksun Kim, Daejeon (KR); Joy Laskar, Marietta, GA (US)

(73) Assignee: Samsung Electro-Mechanics, Gyunngi-Do (KR)

( * ) Notice: Subject to any disclaimer, the term of this patent is extended or adjusted under 35 U.S.C. 154(b) by 855 days.

(21) Appl. No.: 11/754,103

(22) Filed: May 25, 2007

(65) Prior Publication Data
US 2007/0281629 A1  Dec. 6, 2007

Related U.S. Application Data

(60) Provisional application No. 60/803,873, filed on Jun. 4, 2006.

(51) Int. Cl.
*H04B 1/44*  (2006.01)
(52) U.S. Cl. .......................................... 455/83; 343/876
(58) Field of Classification Search ................. 455/13.3, 455/19, 63.4, 82, 83; 343/876
See application file for complete search history.

(56) References Cited

U.S. PATENT DOCUMENTS
2006/0232358 A1 * 10/2006 Jedeloo .................. 333/103

FOREIGN PATENT DOCUMENTS

| | | | |
|---|---|---|---|
| CN | 1689241 A | | 10/2005 |
| EP | 1073208 A2 | * | 1/2001 |
| EP | 1418680 A1 | * | 5/2004 |
| EP | 1418680 A2 | | 12/2004 |
| JP | 08237166 A | | 9/1996 |
| KR | 1020030000658 A | | 6/2003 |
| TW | 200516879 A | | 5/2005 |
| WO | 03032431 A2 | | 4/2003 |
| WO | WO 03/032431 A2 | * | 4/2003 |
| WO | 2004036778 A1 | | 4/2004 |
| WO | 2005008908 A1 | | 1/2005 |

OTHER PUBLICATIONS

Yeh et al., "Design and analysis for a miniature CMOS SPDT switch using body-floating technique to improve power performance", Jan. 2006, In: Microwave Theory and Techniques, IEEE Transactions on, vol. 54, No. 1, p. 31-39.*

(Continued)

*Primary Examiner* — Ping Hsieh (57) ABSTRACT

Systems and methods may be provided for a CMOS RF antenna switch. The systems and methods for the CMOS RF antenna switch may include an antenna that is operative to transmit and receive signals over at least one radio frequency (RF) band, and a transmit switch coupled to the antenna, where the transmit switch is enabled to transmit a respective first signal to the antenna and disabled to prevent transmission of the first signal to the antenna. the systems and methods for the CMOS RF antenna switch may further include a receiver switch coupled to the antenna, where the receiver switch forms a filter when enabled and a resonant circuit when disabled, where the filter provides for reception of a second signal received by the antenna, and where the resonant circuit blocks reception of at least the first signal.

20 Claims, 6 Drawing Sheets

OTHER PUBLICATIONS

Office Action mailed Jan. 22, 2010 by the State Intellectual Property Office of P.R.C. for Chinese Application No. 200710110603.7.
Mei-Chao Yeh, et al., "Design and Analysis for a Miniature CMOS SPDT Switch Using Body-Floating Technique to Improve Power Performance." IEEE Transactions on Microwave Theory and Techniques. vol. 54, No. 1, Jan. 2006, p. 31-39.

Office Action issued on Mar. 10, 2009 (English Translation included) for German Patent Application No. 10 2007 026 024.7.
Office Action for Chinese Application No. 200710110603.7 dated May 11, 2011.
United Kingdom International Search Report for GB0710606.5, dated Sep. 27, 2007.

* cited by examiner

SYSTEMS, METHODS AND APPARATUSES FOR COMPLEMENTARY METAL OXIDE SEMICONDUCTOR (CMOS) ANTENNA SWITCHES USING SWITCHED RESONATORS

RELATED APPLICATION

This application claims priority to U.S. Provisional Ser. No. 60/803,873, entitled "Systems, Methods, and Apparatuses for Complementary Metal Oxide Semiconductor (CMOS) Antenna Switches Using Switched Resonators," filed on Jun. 4, 2006, which is incorporated by referenced as if fully set forth herein.

FIELD OF THE INVENTION

The invention relates generally to antenna switches, and more particularly, to CMOS (complementary metal oxide semiconductor) antenna switches.

BACKGROUND OF THE INVENTION

In the past decade, the wireless communication industry has experienced explosive growth, which has in turn accelerated the development of integrated circuit (IC) industry. In particular, in the IC industry, many mobile application systems like low noise amplifiers (LNAs), mixers, and voltage-controlled oscillators (VCOs) have been integrated into CMOS technology. Two significant mobile application components—power amplifiers (PAs) and radio frequency (RF) switches—have not yet been commercially integrated into CMOS technology.

However, IC industry research is quickly moving towards power amplifier integrated into CMOS technology. For example, current research indicates that a CMOS power amplifier may be feasible and be able to provide a significant amount of power, perhaps up to 2 W, for mobile communications. Accordingly, when the power amplifier becomes integrated into CMOS technology, there will be a need for an RF switch integrated into CMOS technology.

However, current CMOS technology presents a variety of difficulties for its application to RF switches. For example, CMOS material characteristics, including lossy substrates and low breakdown voltages due to low mobility of electrons, have prevented CMOS technology from being used for RF switches that require multi-band operation, high power levels, and/or integration with other devices and circuits.

BRIEF SUMMARY OF THE INVENTION

Embodiments of the invention may provide for CMOS RF switches, which may be referred to as a CMOS SP4T switch. According to an embodiment of the invention, the CMOS RF switch may be fabricated using a variety of processes, including a 0.18 µm process. Indeed, other processes may be utilized without departing from the embodiments of the invention. In order to provide high power handling capability in a multi-band operation (e.g., about 900 MHz and 1.9 Hz) of the CMOS RF switch, an LC switched resonator scheme may be applied to the receiver switch. According to an embodiment of the invention, the CMOS RF switch may provide higher blocking capability at the transmission (TX) mode as well as low insertion loss at the reception (RX) mode at one or more bands, including multi-band (e.g., 900 MHz and 1.9 GHz). As an illustrative example, the CMOS RF switch may achieve a P1 dB watt level power handling capability at 900 MHz and 1.90 Hz respectively with −1.4 dB insertion loss at both bands (900 MHz and 1.9 Gz) in the TX mode. Likewise, in the RX mode, the CMOS RF switch may also achieve an insertion loss of −0.9 dB and −1.4 dB at around 900 MHz and 1.9 GHz, respectively.

According to an embodiment of the invention, there is a method for providing a CMOS antenna switch. The method may include providing an antenna operative to transmit and receive signals over at least one radio frequency (RF) band, and coupling the antenna to a transmit switch, where the transmit switch is enabled to transmit a first signal to the antenna and disabled to prevent transmission of the first signal to the antenna. The method may further include coupling the antenna to a receiver switch that forms a filter when enabled and a resonant circuit when disabled, where the filter provides for reception of a second signal received by the antenna and where the resonant circuit blocks reception of at least the first signal.

According to an embodiment of the invention, there is a system for a CMOS antenna switch. The system may include an antenna that is operative to transmit and receive signals over at least one radio frequency (RF) band, and a transmit switch coupled to the antenna, where the transmit switch is enabled to transmit a respective first signal to the antenna and disabled to prevent transmission of the first signal to the antenna, and a receiver switch coupled to the antenna, where the receiver switch forms a filter when enabled and a resonant circuit when disabled, where the filter provides for reception of a second signal received by the antenna, and where the resonant circuit blocks reception of at least the first signal.

According to yet another embodiment of the invention, there is a system for a CMOS antenna switch. The system may include an antenna operative at a plurality of radio frequency (RF) bands. The system may further include means for transmitting first signals to the antenna, and means for receiving second signals from the antenna, where the means for receiving forms a filter when the means for receiving is operative, and wherein the means for receiving forms a resonant circuit when the means for transmitting is operative.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

The invention now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Embodiments of the invention may provide for CMOS RF antenna switches, which may also be referred to as SP4T CMOS switches. The CMOS RF antenna switches in accordance with embodiments of the invention may provide for one or more of multi-band operation, high power level handling, and integration with other devices and circuits. Generally, the CMOS RF antenna switch may include at least one receiver switch and at least one transmit switch. The receiver switch may utilize one or more switched resonators, as will be described in further detail below. The transmit switch may utilize or otherwise employ a body substrate tuning technique, as will also be described in further detail below.

Description of a Receiver Switch

Figure 1A:
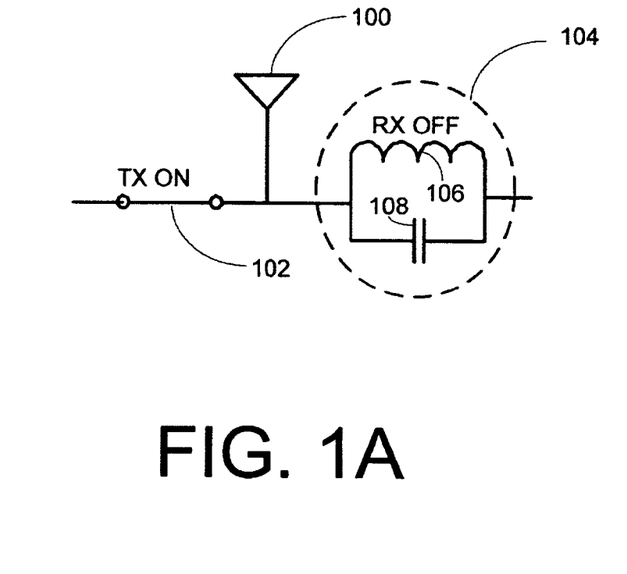
FIGS. 1A and 1B illustrate simplified operations of a receiver switch in accordance with an embodiment of the invention.
Figure 1B:
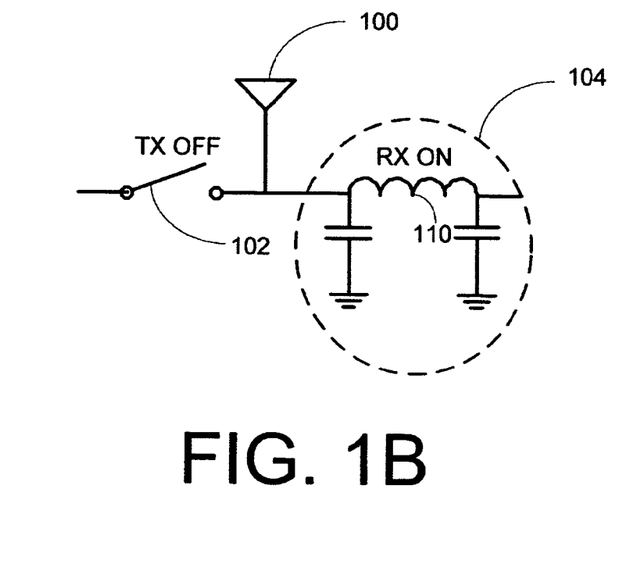

In accordance with an embodiment of the invention, the CMOS RF antenna switch, and in particular, the receiver switch component of the RF antenna switch will be now be described in further detail with reference to FIGS. 1-3. FIGS. 1A and 1B provide an illustrative example of an operation of a simplified CMOS RF antenna switch having a transmit switch 102 and a receiver switch 104, in accordance with an embodiment of the invention. As shown in FIGS. 1A and 1B, a CMOS RF antenna switch may comprise an antenna 100 in communication with at least one transmit switch 102 and at least one receiver switch 104. As shown in FIG. 1A, when the transmit switch 102 is ON (e.g., enabled), thereby providing a transmit signal to the antenna 100, the receiver switch 104 is OFF (e.g., disabled). Likewise, as shown in FIG. 1B, when the receiver switch 104 is ON (e.g., enabled), thereby allowing reception of a receive signal from the antenna 100, the transmit switch 102 is OFF (e.g., disabled). According to an embodiment of the invention, the antenna 100 may be a single multi-mode (e.g., RX and TX), multi-band antenna, although a plurality of distinct antennas may be utilized according to other embodiments of the invention.

Still referring to FIGS. 1A and 1B, the receiver switch 104 may be in the form of a switched resonator, according to an embodiment of the invention. This switched resonator may provide distinctly different equivalent circuits, depending on whether the receiver switch 102 is ON or OFF, respectively. In FIG. 1A, when the receiver switch 104 is OFF, an LC resonant circuit may be formed in accordance with an embodiment of the invention. The LC resonant circuit may block the transmit signal provided from the transmit switch 102 in the ON state, thereby maximizing the power of the signal transmitted via antenna 100. According to an embodiment of the invention, the LC resonant circuit may include at least one inductor 106 in parallel with at least one capacitor 108. The value of the inductor 106 may be sufficiently large, perhaps over 5 nH, depending on the desired operating frequency of the resonant circuit. It will be appreciated that while the LC resonant circuit is illustrated as a parallel resonant circuit in FIG. 1A, other embodiments of the invention may utilize a series resonant circuit as well (e.g., an RLC resonant circuit).

On the other hand, in FIG. 1B, when the receiver switch 104 is ON, a filter may be formed, according to an embodiment of the invention. The filter may be a low-pass filter, with a certain cutoff frequency characteristics according to an embodiment of the invention. In addition, the filter may include a very small inductor 110 value at the desired operating frequency in order to provide for a low insertion loss. Accordingly, the filter 104 may provide for the reception, with low insertion loss, of at least a portion of the receive signal provided from the antenna 100. While the above-described filter is illustrated as a low-pass filter, it will be appreciated that other embodiments of the filter may be a bandpass filter, a high-pass filter, or the like.

Figure 2:
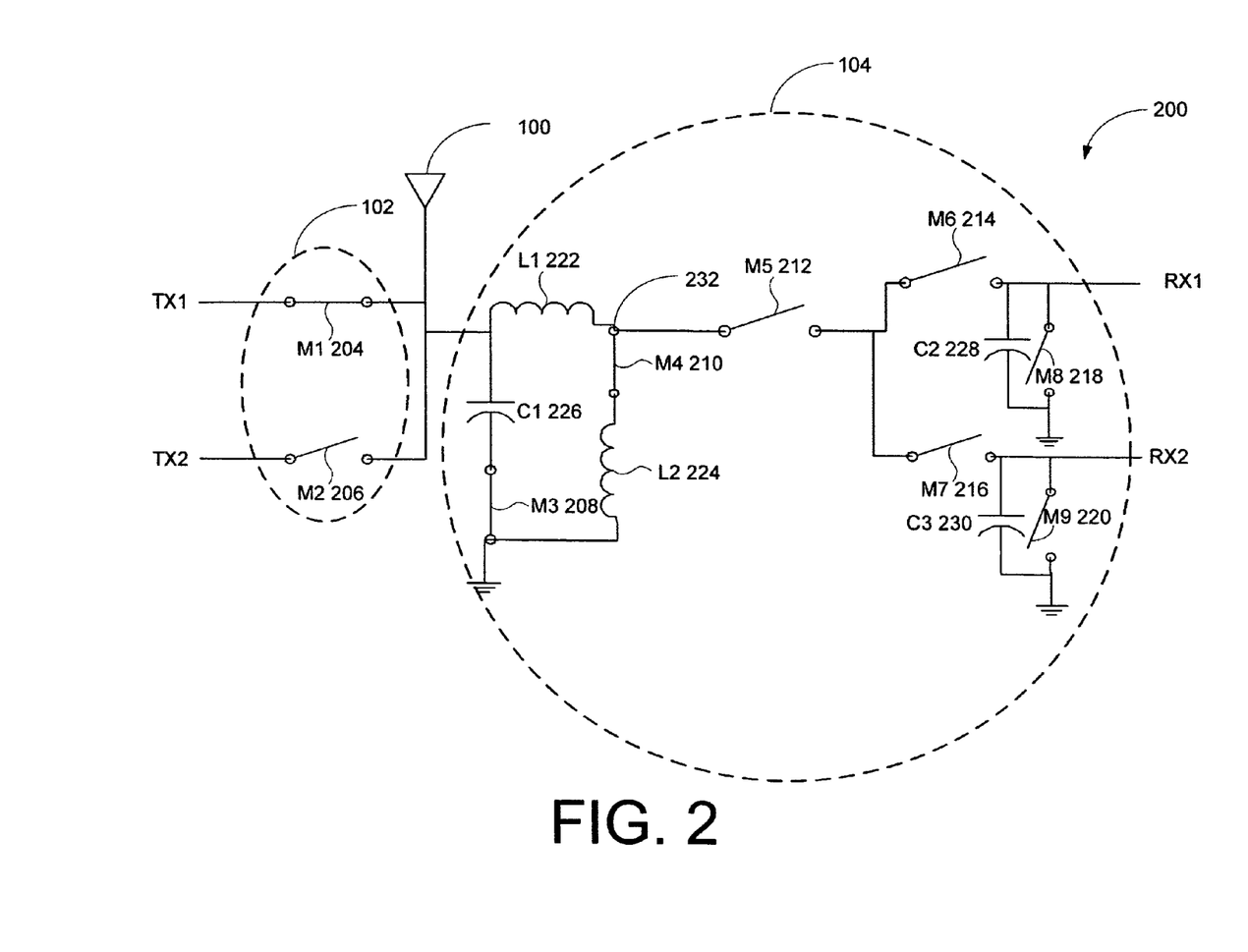
FIG. 2 illustrates a CMOS switch using a switched resonator at a TX mode, in accordance with an embodiment of the invention.

FIG. 2 illustrates an illustrative example of an operation of an RF antenna switch 200 in transmit (TX) mode. In particular, FIG. 2 includes an antenna 100 in communication with the transmit switch 102 and the receiver switch 104. According to an embodiment of the invention, the transmit switch 102 may comprise signal paths for one or more transmit signals. For example, as shown in FIG. 2A, there may be two signal paths—that is, signal paths TX1 and TX2 controlled by switches M1 204 and M2 206, respectively. The switches M1 204 and M2 206 may comprise one or more CMOS switches. Likewise, the receiver switch 104 may include signal paths RX1 and RX2, as controlled by switches M3 208, M4 210, M5 212, M6 214, M7 216, M8 218, and M9 220, which may each comprise one or more CMOS switches.

In FIG. 2, according to an embodiment of the invention, the RF antenna switch 200 is illustrated as operating in TX mode for signal path TX1. With this TX mode configuration for transmit switch 102, switch M1 204 is closed and switch M2 206 is open. In addition, the receiver switch 104 forms an resonant circuit, described in further detail below, by closing switches M3 208, M4 210 while opening switches M5 212, M6 214, and M7 216 to provide a high impedance point at node 232. In addition, although not illustrated as such in FIG. 2, switches M8 218 and M9 220 may also be closed to bypass leakage signals to ground ion order to protect the low-noise amplifier (LNA) from such leakage signals. One of ordinary skill in the art will recognize that in FIG. 2, signal path TX2 could have been enabled instead of signal path TX1 without departing from embodiments of the invention. It will also be appreciated that the configuration of the transmit switch 102 and receiver switch 104, including the numbers of transmit and receive signal paths, may be varied without departing from embodiments of the invention.

In the configuration illustrated in FIG. 2, the power handling capability of the transmit switch 102 may be based upon the impedance of the resonant circuit and the source-to-drain breakdown voltage of cascaded switches M5 212, M6 214 M7 216 of the receiver switch 104. In other words, the maximum transmit power of the transmit switch 102 may be dependent upon the impedance and breakdown characteristics of the receiver switch 104.

According to an embodiment of the invention, the resonant circuit may be an LC parallel resonant circuit formed by inductors L1 222, L2 224 in parallel with capacitor C1 226. In order to provide the desired blocking during the TX mode configuration to maximize the transmit signal power, the inductance value of inductor L2 224 may be sufficiently large. However, the ratio of the value of inductors L1 222 and L2 224 may be related to the power handling of the transmit switch 102. Accordingly, if the value of L1 222 is too small, then a large voltage swing may be above the source-to-drain breakdown voltage of switches M5 212, M6 214, and/or M7 216, which are intended to be open to provide a high impedance point at node 232. Therefore, the value of the inductor L1 222 may be selected to yield the optimum voltage swing for the TX mode and low insertion loss for the RX mode.

Figure 3:
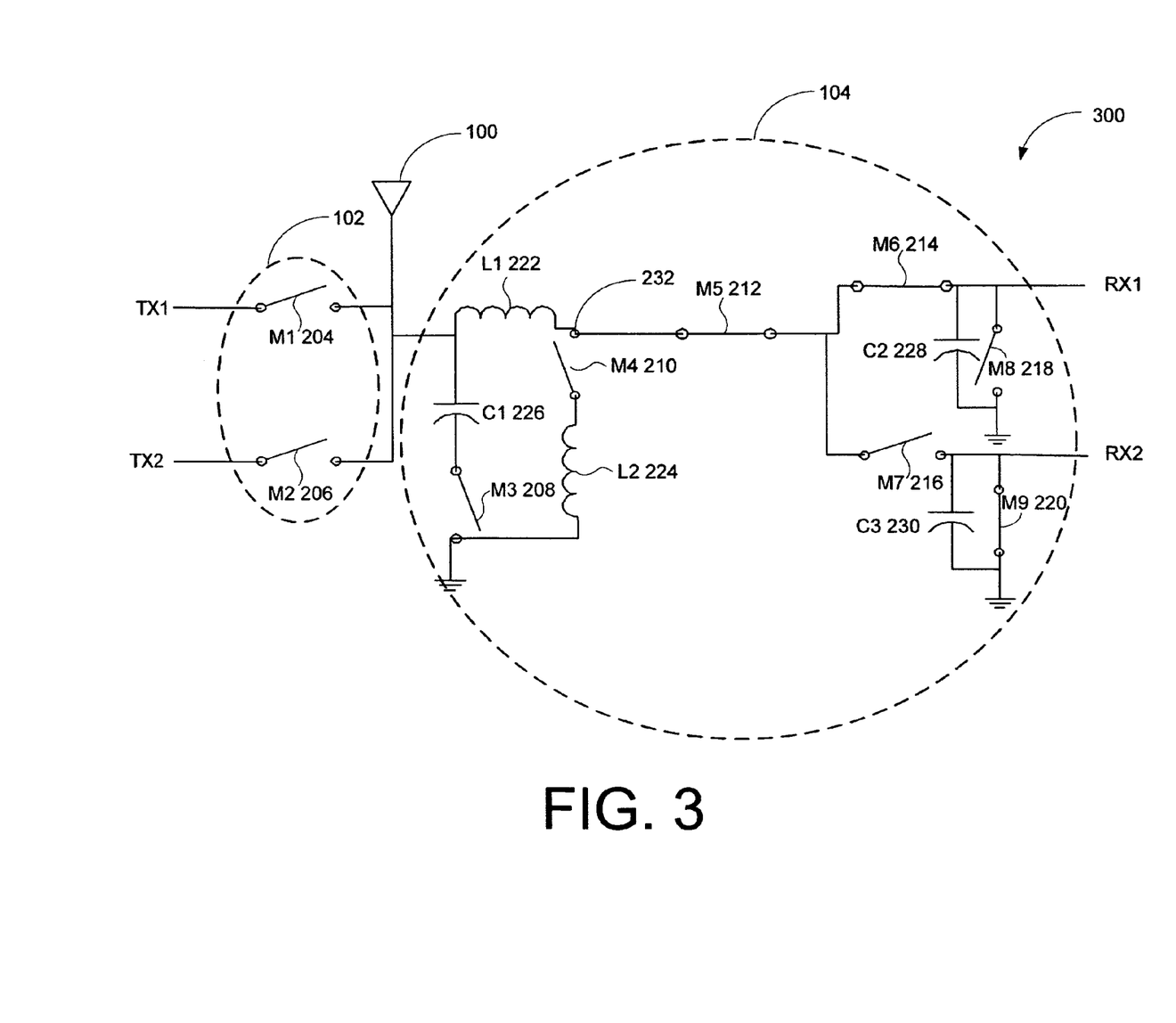
FIG. 3 illustrates a CMOS switch using a switched resonator at RX mode, in accordance with an embodiment of the invention.

In accordance with an embodiment of the invention, FIG. 3 provides an illustrative operation of an RF antenna switch 300 in transmit (RX) mode. As shown in FIG. 3, both switch M1 204 and switch M2 206 of the transmit switch 102 are open to isolate antenna 100 from transmit signal paths TX1 and TX2, respectively. However, in enabling receive signal path RX1, switches M3 208, M4 210, and M5 218 are open, while switches M5 212 and M6 214 are closed. Further, to bypass leakage signal to ground to protect the low noise amplifier (LNA), switch M9 220 may be closed. One of ordinary skill in the art will recognize that signal path RX2 could have been enabled instead of signal path RX1 without departing from embodiments of the invention.

Still referring to FIG. 3, a low-pass filter may be formed using inductor L1 222 and capacitor C2 228. If low insertion loss is a primary consideration, then the inductor L1 222 value may be as small as possible. However, as described above with respect to FIG. 2, the value of inductor L1 222 impacts the voltage swing of the TX mode, and thus, the value of inductor L1 222 may be selected to provide the optimum voltage swing for the TX mode and low insertion loss for the RX mode.

Dual Band operation

As described with reference to FIGS. 1-3, the receiver switch 104 (e.g., switched resonator) may provide for an LC resonator in the TX mode and an LC lowpass filter for the RX mode. In addition, as shown in FIGS. 2 and 3, there may be two transmit signal paths TX1 and TX2 and two receive signal paths RX1 and RX2. It will be appreciated, however, that fewer transmit or receive paths may be included as desired without departing from embodiments of the invention. In accordance with an embodiment of the invention, TX1 and RX1 may be provided for GSM band (e.g., 900 MHz) communications and TX2 and RX2 may be provided for DCS/PCS band (e.g., 1.9 GHz) communications, although different bands may be utilized as well. In addition, more than two bands—perhaps three or four bands—may also be supported without departing from embodiments of the invention.

As the number of signal paths at the antenna 100 increases, however, the power handling capability of the transmit switch 102 may drop. Accordingly, in a single-pole multi-throw switch, it may be desirable to decrease the number of signal paths at the antenna 100. For instance, as shown in FIGS. 2 and 3, RX1 and RX2 of the receiver switch 104 may share one LC parallel resonator at the antenna 100 front end, where the LC parallel resonator is comprised of inductors L1 222, L2 224 and capacitor C1 226. As described above, the LC parallel resonator may block the transmit signals from TX1 and TX2 at either band. Instead of having a switched resonator with two switched transmission zeros at dual bands, the LC parallel resonator described above may have only one transmission zero, which may be at 1.5 GHz with a wide band, according to an embodiment of the invention. In addition, the LC parallel resonator may provide for −13 dB, −25 dB and −14 dB return loss at 900 MHz, 1.5 GHz, and 1.9 GHz, respectively.

Description of a Transmit Switch

Figure 4A:
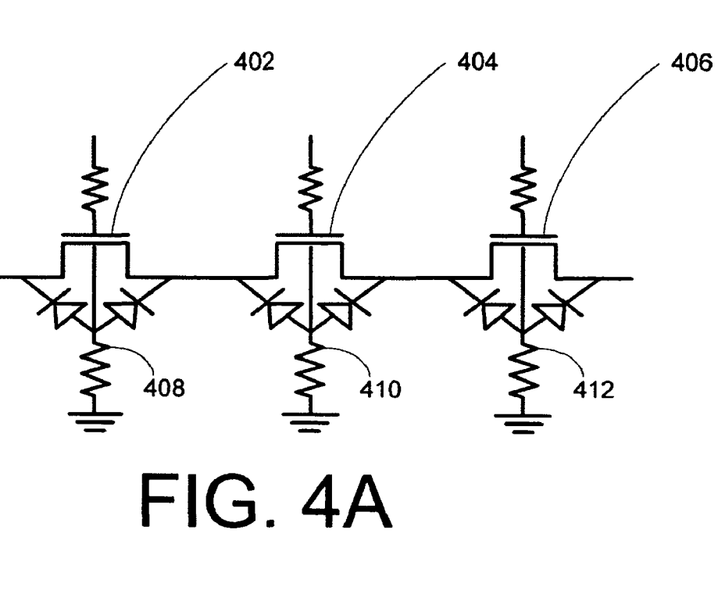
FIG. 4A illustrates a multi-stacked switch at a TX path, in accordance with an embodiment of the invention.

The transmit switch 102 in FIGS. 2 and 3 will now be described in further detail with reference to FIGS. 4A and 4B. In particular, FIG. 4A illustrates a transmit switch 102 structure for switch M1 204 at TX1 and switch M2 206 at TX2 according to an exemplary embodiment of the invention. As shown in FIG. 4A, switches M1 204 and M2 206 may include stacked transistors such as CMOS transistors 402, 404, and 406 stacked (e.g., cascaded) from source to drain. By stacking transistors 402, 404, and 406 from source to drain, the cumulative breakdown voltage can be increased since it is split among the transistors 402, 404, and 406, thereby providing for a higher power blocking capability. Such a high power blocking capability may be necessary, for example, at switch M2 206 at TX2 when switch M1 204 at TX1 is closed to transmit a signal. While FIG. 4 illustrates three stacked transistors, it will be appreciated that fewer or more stacked can be cascaded as well.

However, by stacking the transistors 402, 404, and 406, the insertion loss of the transmit switch 102 may be increased. Accordingly, as shown in FIG. 4A, a body floating technique, which includes connecting high resistor 408, 410, and 412 values at the body substrate, may be applied to the transmit switch 102 in accordance with an embodiment of the invention With such a body floating technique, the transistors 402, 404, and 406 may use a deep N-well structure, perhaps of a 0.18-um CMOS process, which may be immune to potential latch ups due to connecting high resistor 408, 410, 412 values at the body substrate. The resistors 408, 410, 412, which may also be referred to as body floating resistors, may reduce the insertion loss by blocking leakage current to the substrate ground.

Figure 4B:
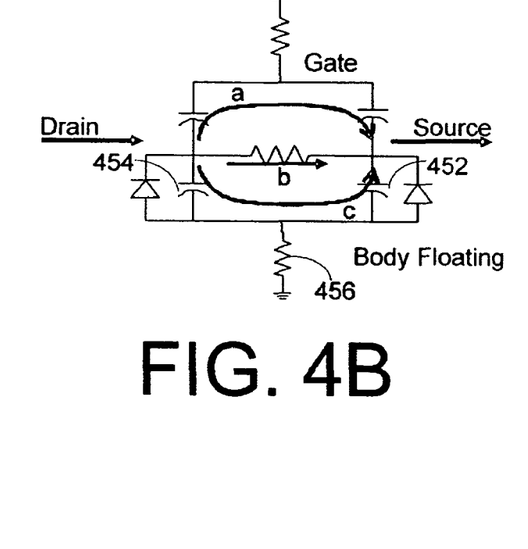
FIG. 4B illustrates a simplified equivalent model of on state switch using a body floating technique switch with signal flow, in accordance with an embodiment of the invention.

FIG. 4B illustrates signal flow at on single stage switch—for example, transistor 402, 404, or 406. As the size of a transistor 402, 404, 406 increases, the parasitic capacitance value becomes high enough so that source-to-body 452 and drain-to-body 454 parasitic capacitor with body floating resistor 456 may be used as signal path c at the ON state. However, if the body is grounded, signal path c in FIG. 4B is bypassed to the ground, which results in degraded insertion loss.

Simulation results

Figure 5:
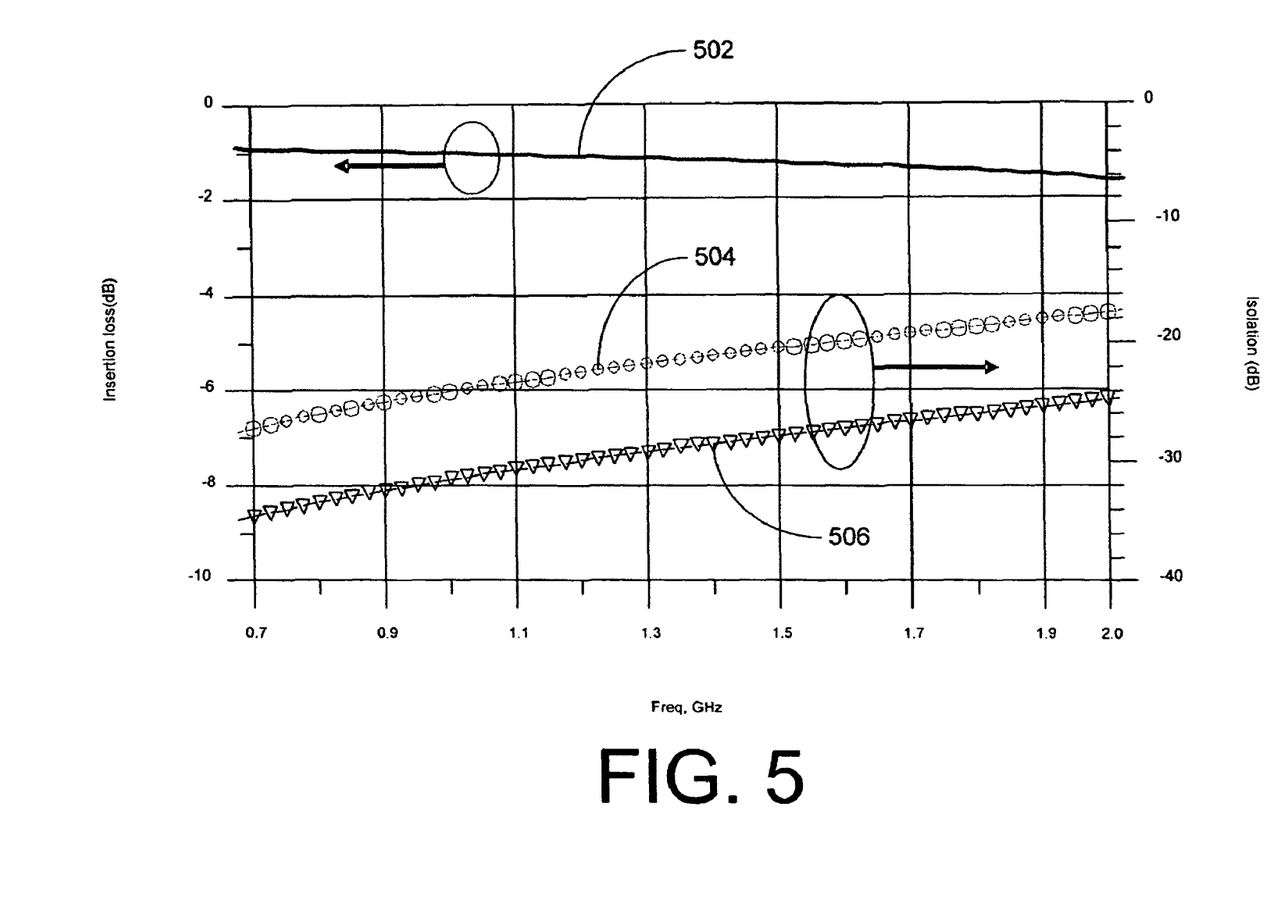
FIG. 5 illustrates exemplary receiver switch simulation results, in accordance with an embodiment of the invention.

FIG. 5 illustrates simulation results for the operation of an exemplary multi-band (e.g., 900 MHz, 1.9 GHz) receiver switch 104 in accordance with an embodiment of the invention. These simulation results illustrate the insertion loss 502, the isolation 504 from the antenna 100 to the TX, and the isolation 506 between RX1 and RX2. In particular, the insertion loss 502 is illustrated by the top solid line. The isolation 504 measured between the antenna 100 and the TX is illustrated by the middle line. Likewise, the isolation 506 between RX1 and RX2 is illustrated by the bottom line.

Figure 6A:
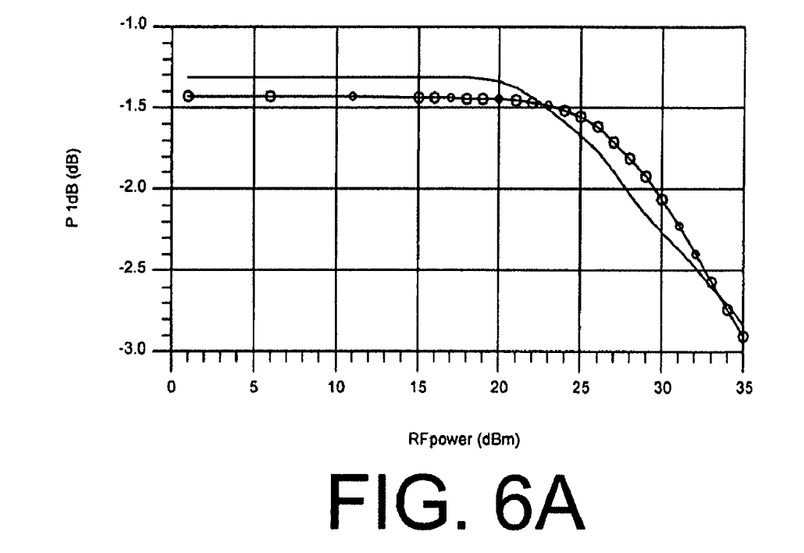
FIGS. 6A and 6B illustrate exemplary transmit switch simulation results, in accordance with an embodiment of the invention.
Figure 6B:
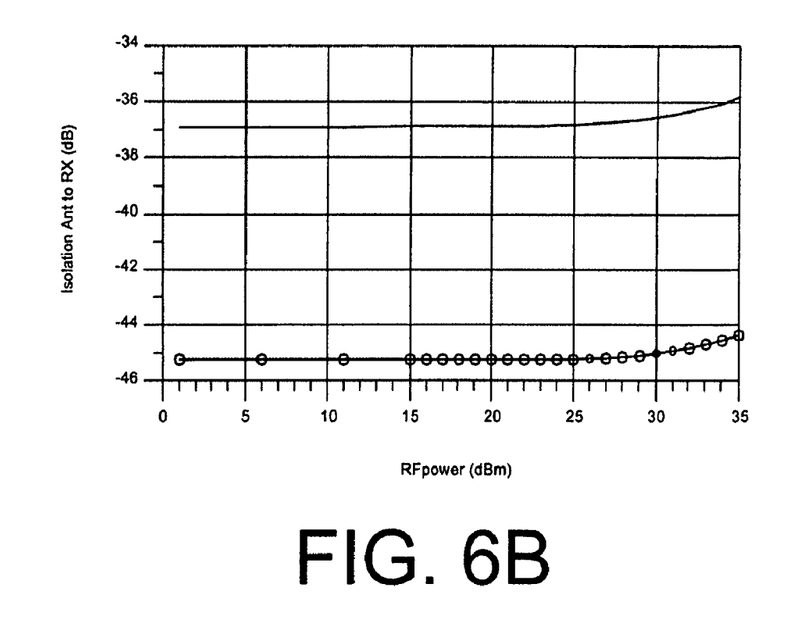

FIG. 6 illustrates simulation results for the operation of an exemplary multi-band transmit switch 102. In particular, the simulation results in FIGS. 6A illustrate the power handling capability while FIG. 6B illustrates the isolation from the antenna 100 to the RX. In both FIGS. 6A and 6B, the solid lines represent simulations at the first band of 1.9 GHz while the circled lines represent simulations at the second band of 900 MHz.

One of ordinary skill in the art will recognize that the simulation results are provided by way of example only. Indeed, the transmit switch 102 and the receiver switch 104 may be configured for other bands of operation as well. Accordingly, the simulation results may likewise be provided for other bands of operations without departing from embodiments of the invention.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method comprising:
providing an antenna operative over a plurality of radio frequency (RF) bands;

providing a transmit switch comprising a first signal transmission path and a second signal transmission path, the first signal transmission path configured for delivering transmit signals to the antenna at a first frequency, and the second signal transmission path configured for delivering transmit signals to the antenna at a second frequency different from the first frequency;

providing a receiver switch comprising a first inductor having a first inductance value, a second inductor having a second inductance value that is larger than the first inductance value, a first capacitor, a first switch with one switch terminal connected to the first inductor and another switch terminal connected to the second inductor, and a second switch with one switch terminal connected to the first capacitor and another switch terminal connected to the second inductor;

during a transmit mode of operation, configuring the first and second switches to place the first and the second inductors in a series connection, the series connection of the first and the second inductors operating in parallel with the first capacitor to present a high impedance that maximizes signal power transmitted out of the antenna; and during a receive mode of operation, configuring the first switch to disconnect the second inductor from the first inductor, thereby minimizing insertion loss for a signal received from the antenna and propagated through the first inductor.

2. The method of claim 1, wherein during the transmit mode, the first and second switches are closed to form a resonant circuit that presents the high impedance that maximizes signal power transmitted out of the antenna.

3. The method of claim 1, wherein during the receive mode, the first and second switches are opened to allow signal propagation through the first inductor, but not the second inductor or the first capacitor.

4. The method of claim 1, wherein the transmit switch comprises a plurality of CMOS transistors cascaded from source to drain, thereby increasing a breakdown voltage of the cascaded CMOS transistors.

5. The method of claim 4, wherein each CMOS transistor includes a body substrate, and further comprising connecting a resistor from at least one body substrate to ground.

6. The method of claim 1, wherein at least one of the first switch or the second switch is a CMOS switch.

7. The method of claim 1, wherein the transmit switch includes at least a third switch and a fourth switch, wherein the third switch controls the first signal transmission path, and wherein the fourth switch controls the second signal transmission path.

8. The method of claim 1, wherein the receiver switch further comprises a third switch and a fourth switch, wherein the third switch controls a first receive signal path, and the fourth switch controls a second receive signal path, wherein when the third switch is enabled during the receive mode and the receive signals are received by the first receive path, the first inductor is connected to a second capacitor that forms a component of a filter; and wherein when the fourth switch is enabled during the receive mode and receive signals are received by the second receive path, the first inductor is connected to a third capacitor that forms a component of the filter.

9. The method of claim 1, wherein a ratio of the first inductance value to the second inductance value is selected in accordance with a power handling capacity of the transmit switch.

10. A system comprising:

an antenna that is operative over a plurality of radio frequency (RF) bands;

a transmit switch comprising at least one signal transmission path for coupling a transmit signal to the antenna; and a receiver switch coupled to the antenna, wherein the receiver switch comprises a first inductor having a first inductance value, a second inductor having a second inductance value that is larger than the first inductance value, a first capacitor, a first switch with one switch terminal connected to the first inductor and another switch terminal connected to the second inductor, and a second switch with one switch terminal connected to the first capacitor and another switch terminal connected to the second inductor, wherein during a transmit mode of operation, the first and second switches are configured to place the first and the second inductors in a series connection, the series connection of the first and the second inductors operating in parallel with the first capacitor to present a high impedance that maximizes signal power transmitted out of the antenna; and wherein during a receive mode of operation, the first switch is configured to disconnect the second inductor from the first inductor, thereby minimizing insertion loss for a receive signal that is propagated through the first inductor but not the second inductor.

11. The system of claim 10, wherein during the transmit mode, the first and second switches are closed to form a resonant circuit that presents the high impedance.

12. The system of claim 10, wherein during the receive mode, the first and second switches are opened to allow signal propagation through the first inductor, but not the second inductor or the first capacitor.

13. The system of claim 10, wherein the first inductor is a part of a lowpass filter.

14. The system of claim 10, wherein the transmit switch comprises a plurality of CMOS transistors cascaded from source to drain, thereby increasing a breakdown voltage of the cascaded CMOS transistors.

15. The system of claim 14, wherein each CMOS transistor includes a body substrate, and further comprises at least one resistor connecting at least one body substrate to ground.

16. The system of claim 10, wherein the first switch is a first CMOS switch and the second switch is a second CMOS switch, wherein the first and second CMOS switches are open to allow signal propagation through the first inductor, but not the second inductor or the first capacitor.

17. The system of claim 10, wherein the receive signal is routed to a low noise amplifier (LNA) through the first inductor.

18. The system of claim 10, wherein the transmit switch includes a third switch for configuring the first signal transmission path.

19. The system of claim 10, wherein the receiver switch further comprises a third switch and a fourth switch, wherein the third switch controls a first receive signal path, and the fourth switch controls a second receive signal path,
  wherein when the third switch is enabled during the receive mode and the receive signals are received by the first receive path, the first inductor is connected to a second capacitor that forms a component of a filter; and
  wherein when the fourth switch is enabled during the receive mode and receive signals are received by the second receive path, the first inductor is connected to a third capacitor that forms a component of the filter.

20. The system of claim 10, wherein a ratio of the first inductance value to the second inductance value is selected in accordance with a power handling capacity of the transmit switch.

* * * * *